July 8, 1952  H. R. FOSTER ET AL  2,602,837
MEANS FOR MEASURING INSTANTANEOUS ROTATIONAL SPEED VARIATIONS
Filed Oct. 22, 1949
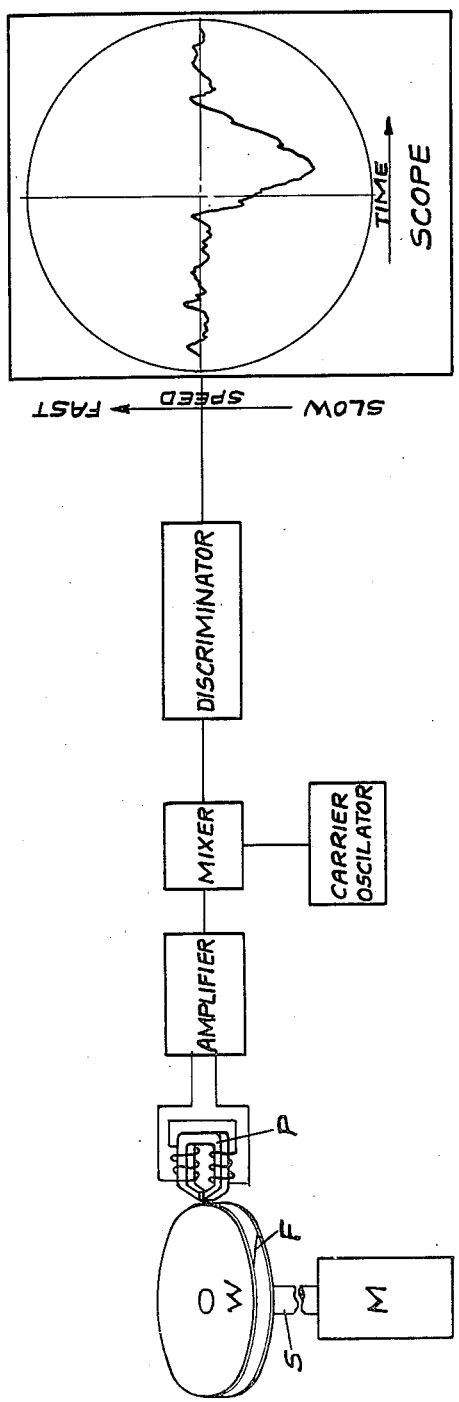
INVENTORS.
HARRY R. FOSTER
ELMO E. CRUMP
BY Patented July 8, 1952

2,602,837

UNITED STATES PATENT OFFICE 2,602,837

MEANS FOR MEASURING INSTANTANEOUS ROTATIONAL SPEED VARIATIONS

Harry R. Foster, East Orange, and Elmo E. Crump, West Caldwell, N. J., assignors to Ohmega Laboratories, Pine Brook, N. J.

Application October 22, 1949, Serial No. 123,056

6 Claims. (Cl. 175—183)

In the operation of a great many devices or structures which have rotating parts many things may act to cause variations in the rotational speed which the usual speed indicators such as tachometers that give only average speeds will not show. It is therefore the principal object of our invention to produce means for indicating instantaneous variations in rotational speeds to an accuracy of about .01% or even more accurate. In attaining the principal object we do this basically by reducing speed to a measure of frequency which we believe to be the most accurate manner of getting a solution to the problem. This frequency variation is measured in the manner to be described by reference to the accompanying drawing wherein, a disc or wheel W of non-magnetic material is connected to a device which is to be tested but for the purpose of illustration it is shown connected to a motor M through the medium of a shaft S which is shown broken to indicate that some connecting means may be inserted if necessary between the motor or device to be tested and the wheel W. On the edge of the wheel W there is applied, in any suitable manner, a magnetic film F on which has been recorded a wave form of say 20,000 C. P. S. Positioned closely adjacent the film F are cores poles preferably adjustable of an electromagnetic pick-up device P having a winding connected to an amplifier then to a mixer and on to a discriminator and then to a cathode ray oscilloscope, a carrier oscillator being connected to the mixer as indicated. Preferably the oscillator utilizes quartz crystals as we have found them the most precise for this particular work.

It may be mentioned that the desired wave form can be applied to the film F by connecting the pick-up device P to a suitable frequency voltage.

In the operation of this apparatus, as the wheel W is rotated, say at 1800 R. P. M., a voltage having a frequency of 20,000 C. P. S. will appear at the leads of the pick-up device P. Now assume that the speed of the wheel W changes over some small angle or has a variation of .1%. This will mean that a frequency of 20,020 C. P. S. will appear at the terminals of the pick-up coil P. The amplifier amplifies this voltage which is then converted into a frequency of 1000 C. P. S. by means of the mixer and carrier oscillator since this latter device is set at 21,000 C. P. S., so that the frequency center now is 1000 C. P. S., hence .1% variation in the original frequency of 20,000 C. P. S. will give a frequency of 1020 C. P. S. This voltage and frequency from the mixer is then applied to the discriminator which converts this frequency variation into amplitude variations which is shown in the oscilloscope.

By way of example the wave form shown on the scope was obtained by just giving the wheel W a slight touch by a finger of one of the present inventors. The show is half size of the wave recorded on the scope, whereas a tachometer held to the motor shaft by the other inventor showed no change in speed. This illustration shows how sensitive is the structure, which we call a rotalyzer, it being understood that the unit circuits are all installed in one container which also preferably carries the scope. From the tests we have made we believe the rotalyzer to be applicable to many uses, by way of illustration but not of limitation, for example, 1. Checking bearings which may have high spots that would give small speed changes.
2. Checking gear trains wherein defective teeth would show up as speed changes.
3. Checking belt drives.
4. Checking internal combustion engines where rotational speed is caused by a series of pulses.
5. Checking camera drives.
6. Checking electric motors re slot effects.
7. Checking flutter in phonograph drives.

While we prefer an oscilloscope to receive the result any other sensitive instrument such as a meter may be used. Other details may be varied without departing from our invention and scope of the appended claims.

Having thus described our invention what we claim is:

1. Means for measuring instantaneous rotational speed variations comprising, a rotatable disc or wheel having a film of magnetic material applied thereto preferably on the wheel rim, said film having a voltage record thereon in the form of magnetic flux variations, at a desired relatively high frequency, an electro-magnet having preferably adjustable pole pieces for picking up this frequency voltage from said film, an amplifier for amplifying this frequency voltage, a mixer and carrier oscillator for receiving and converting said amplified frequency voltage to a relatively low frequency, a discriminator for receiving said low frequency voltage and covering the frequency variations into amplitude variations and an oscilloscope for receiving and displaying said amplitude variations.

2. Means for measuring instantaneous rotational speed variations comprising, a rotatable disc or wheel having a film of magnetic material applied thereto preferably on the wheel rim, said film having a voltage record thereon in the form of magnetic flux variations at a frequency of the order of 20,000 C. P. S. an electromagnet having preferably adjustable pole pieces for picking up this frequency voltage from said film, an amplifier for receiving and amplifying said frequency voltage, a mixer and carrier oscillator for receiving and converting said frequency voltage to a frequency of the order of 1000 C. P. S., a discriminator for receiving said 1000 C. P. S. voltage and converting the frequency variations into amplitude variations and an oscilloscope for receiving and displaying said amplitude variations.

3. Means for measuring instantaneous rotational speed variations as set forth in claim 1 further characterized in that quartz crystals are utilized in the carrier oscillator.

4. Means for measuring instantaneous rotational speed variations as set forth in claim 2 further characterized in that quartz crystals are utilized in the carrier oscillator.

5. Means for measuring instantaneous rotational speed variations comprising, a rotatable disc or wheel having a film of magnetic material applied thereto preferably on the wheel rim, means for applying to said film a voltage record in the form of magnetic flux variations, said last mentioned means may also serve to pick-up said variations, an amplifier for receiving and amplifying them, a mixer and carrier oscillator for receiving said variations and transforming them to amplitude variations and an oscilloscope for receiving and displaying said amplitude variations.

6. Means for detecting and measuring small and instantaneous speed variations in a device comprising, a disc or wheel of non-magnetic material, the disc wheel having a film of magnetic material applied thereto to rotate therewith, the disc or wheel being mounted for rotation on said device, the variations in speed of which are to be detected, means for applying to said film a voltage record in the form of magnetic flux variations, said applying means also serving to pick up said variations, an amplifier to directly receive said variations and amplifying them, a mixer and carrier oscillator for receiving said variations and finally an oscilloscope for receiving and displaying said variations.

HARRY R. FOSTER.
ELMO E. CRUMP.

REFERENCES CITED

The following references are of record in the file of this patent:

UNITED STATES PATENTS

| Number | Name | Date |
| --- | --- | --- |
| 1,804,156 | Keller | May 5, 1931 |
| 2,337,328 | Hathaway | Dec. 21, 1943 |
| 2,411,595 | Sanders | Nov. 26, 1946 |
| 2,419,527 | Bartelink | Apr. 29, 1947 |
| 2,475,742 | Hammond | July 12, 1949 |
| 2,496,103 | Neufeld | Jan. 31, 1950 |

OTHER REFERENCES

"Electronics," March 1948, pages 108–111.